(12) United States Patent
Sandu et al.

(10) Patent No.: US 9,031,679 B2
(45) Date of Patent: May 12, 2015

(54) METHODS, SYSTEMS, AND COMPUTER READABLE MEDIA FOR UTILIZING A PLURALITY OF PRE-ENCODED PAYLOADS TO GENERATE A PACKET STREAM TRANSMISSION

(75) Inventors: Andrei Mihail Sandu, Bucharest (RO); Andrei Paduraru, Vaslui (RO); Lucian Leventu, Bucharest (RO)

(73) Assignee: IXIA, Calabasas, CA (US)

( * ) Notice: Subject to any disclaimer, the term of this patent is extended or adjusted under 35 U.S.C. 154(b) by 282 days.

(21) Appl. No.: 13/472,125

(22) Filed: May 15, 2012

(65) Prior Publication Data
US 2013/0310959 A1    Nov. 21, 2013

(51) Int. Cl.
| | |
|---|---|
| *G06F 17/00* | (2006.01) |
| *H04L 12/66* | (2006.01) |
| *H04L 12/50* | (2006.01) |
| *G01R 5/12* | (2006.01) |
| *H04L 12/26* | (2006.01) |
| *G10L 19/002* | (2013.01) |
| *H04Q 11/00* | (2006.01) |

(52) U.S. Cl.
CPC ............ *H04L 43/50* (2013.01); *H04L 12/2697* (2013.01); *H04Q 11/00* (2013.01); *G10L 19/002* (2013.01)

(58) Field of Classification Search
CPC ..... H04L 11/00; H04L 12/26; H04L 12/2602; H04L 12/2697; H04L 43/50; G10L 19/002
USPC .................... 700/94; 370/250, 358, 360, 391; 375/E7.023
See application file for complete search history.

(56) References Cited

U.S. PATENT DOCUMENTS

| | | | | |
|---|---|---|---|---|
| 6,138,051 | A  * | 10/2000 | Dieterich ......................... | 700/94 |
| 6,421,749 | B1 * | 7/2002 | Devlin et al. .................... | 710/65 |
| 7,747,338 | B2 * | 6/2010 | Korhonen ........................ | 700/94 |
| 2011/0225315 | A1 * | 9/2011 | Wexler et al. .................. | 709/231 |

OTHER PUBLICATIONS

Network Working Group, "Real-Time Transport Protocol (RTP) Payload Format and File Storage Format for the Adaptive Multi-Rate (AMR) and Adaptive Multi-Rate Wideband (AMR-WB) Audio Codecs", Jun. 2002, pp. 1-10.*
"IxLoad," Solution Brief, 915-3030-01. D, Ixia, pp. 1-4 (Feb. 2012).

* cited by examiner

*Primary Examiner* — Jesse Elbin
(74) *Attorney, Agent, or Firm* — Jenkins, Wilson, Taylor & Hunt, P.A.

(57) ABSTRACT

Methods, systems, and computer readable media for utilizing a plurality of pre-encoded payloads in a stream transmission are disclosed. According to one aspect, a method includes receiving a plurality of payload streams associated with an audio stream clip file and selecting a first payload stream encoded at a first bit rate from the plurality of payload streams as the payload for a packet stream transmission being sent to a device under test. The method also includes receiving a bit rate change request that indicates a second payload stream encoded at a second bit rate is to be used as the payload for the packet stream transmission and conducting a synchronization procedure that synchronizes a first packet of the second payload stream with a last packet of the first payload stream in order to transition the packet stream transmission from the first bit rate to the second bit rate.

20 Claims, 4 Drawing Sheets

METHODS, SYSTEMS, AND COMPUTER READABLE MEDIA FOR UTILIZING A PLURALITY OF PRE-ENCODED PAYLOADS TO GENERATE A PACKET STREAM TRANSMISSION

TECHNICAL FIELD

The subject matter described herein relates to the efficient simulation of digital data signals generated by testing telecommunications network equipment. More specifically, the subject matter relates to methods, systems, and computer readable media for utilizing a plurality of pre-encoded payloads to generate a packet stream transmission.

BACKGROUND

At present, mobile traffic generation testing devices are configured to generate a high number of real adaptive multi-rate (AMR) streams and/or AMR-WB streams for use as payload data sent via a packet stream transmission to a device under test (DUT). Typically, audio data is encoded using an AMR or AMR-WB codec for all supported bit rates. In the event a bit rate change is requested by a device under test (DUT), the testing device utilizes its central processing unit (CPU) to adjust the encoder to begin encoding the audio signal at the desired bit rate at runtime. This manner of real-time encoding consumes a significant amount of CPU resources and inherently produces response delays to the bit rate change requests. Moreover, the real-time encoding approach does not scale well for a large number of data streams commonly exchanged in a testing environment.

Accordingly, in light of these difficulties, a need exists for improved methods, systems, and computer readable media for utilizing a plurality of pre-encoded payloads to generate a packet stream transmission.

SUMMARY

Methods, systems, and computer readable media for utilizing a plurality of pre-encoded payloads to generate a packet stream transmission are disclosed. According to one embodiment, the method includes receiving a plurality of digital payload streams associated with an audio stream clip file, wherein at least some of the digital payload streams are generated by encoding the audio stream clip file at different bit rates and selecting a first digital payload stream encoded at a first bit rate from the plurality of digital payload streams as the payload for a packet stream transmission being sent to a device under test (DUT). The method also includes receiving a bit rate change request that indicates a second digital payload stream encoded at a second bit rate from the plurality of digital payload streams is to be used as the payload for the packet stream transmission being sent to the DUT. The method further includes conducting a synchronization procedure that synchronizes a first packet of the second digital payload stream with a last packet of the first digital payload stream in order to transition the packet stream transmission from the first bit rate to the second bit rate, wherein the last packet is a packet being processed for the packet stream transmission at the time the bit rate change request is received.

The subject matter described herein may be implemented in software in combination with hardware and/or firmware. For example, the subject matter described herein may be implemented in software executed by a processor (e.g., a hardware-based processor). In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function", "unit", or "module" refer to software in combination with hardware and/or firmware for implementing features described herein. In one embodiment, a module may include a field programmable gate array.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable media for utilizing a plurality of pre-encoded payloads to generate a packet stream transmission. Reference will now be made in detail to exemplary embodiments of the present subject matter, examples of which are illustrated in the accompanying drawings. Wherever possible, the same reference numbers will be used throughout the drawings to refer to the same or like parts.

Figure 1:
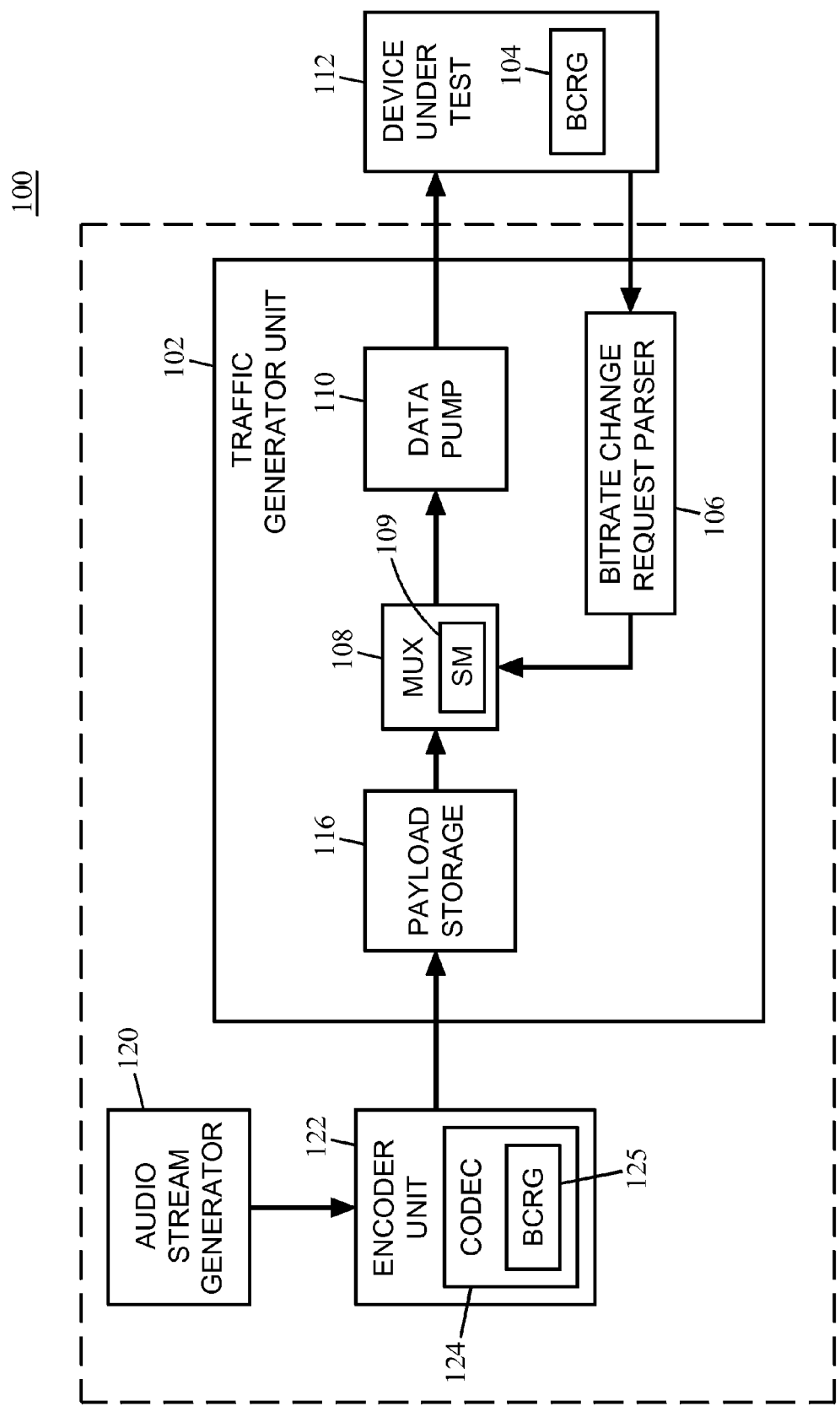
FIG. 1 is a block diagram illustrating an exemplary system that utilizes a plurality of pre-encoded payloads to generate a packet stream transmission according to an embodiment of the subject matter described herein.

FIG. 1 is a diagram illustrating an exemplary testing environment system 100 or platform. Testing environment system 100 may include a traffic generator unit 102 (or traffic generator/receiver device or traffic generator/receiver unit) communicatively connected to a system under test or a device under test (DUT) 112. In one embodiment, DUT 112 may include a mobile phone device, a soft phone, a media gateway, or any other device capable of conducting voice over Internet protocol (VoIP) calls and configured to receive and send adaptive multi-rate (AMR) streams (e.g., AMR narrowband or wideband streams). System 100 may also include an audio stream generator 120 and an encoder unit 122.

In one embodiment, audio stream generator 120 includes a server or computer that is configured to simulate signals produced or forwarded by one or more user equipment (UE) devices, network nodes, and the like. For example, audio stream generator 120 may produce a plurality of audio stream clip files (e.g., "audio stream clips") that is forwarded to encoder unit 122. The generated audio stream clips produced for testing purposes may be different or identical from each other.

In one embodiment, encoder unit 122 comprises a device or computer which includes a codec module 124 configured to receive and process the audio stream clips generated by audio stream generator 120. For example, codec module 124 may be configured to encode each received audio stream clip into a plurality of digital payload streams of varying bit rates. In one embodiment, codec module 124 may be an AMR audio codec (e.g., a narrowband AMR (AMR-NB) codec) that is able to encode each received audio stream clip into eight (8) different encoded AMR payloads (i.e., digital payload streams), each of which has a different bit rate (e.g., 4.75, 5.15, 5.90, 6.70, 7.40, 7.95, 10.20, and 12.20 kbit/sec). In an alternate embodiment, codec module 124 may be a wideband AMR (AMR-WB) audio codec that is able to encode each received audio stream clip into nine (9) different digital AMR payloads, each of which has a different bit rate (e.g., 6.60, 8.85, 12.65. 14.25, 15.85, 18.25, 19.85, 23.05, and 23.85 kbit/sec). In one embodiment, codec module 124 may be a combination of both an AMR audio codec and an AMR-WB audio codec. Codec module 124 may also include a bit rate change request generator module 125. In one embodiment, bit rate change request generator module 125 is configured to encode bit rate change instructions that are ultimately sent to DUT 112 into each of the digital payload streams. In one embodiment, the audio stream clip file is encoded into the digital frame payload streams without being compressed (i.e., without performing any data compression). As used herein, the term pre-encoded refers to the encoding of the digital payload streams prior to receiving a bit rate change request from DUT 112 (see below).

The underlying AMR payload of a digital frame stream (e.g., packet stream transmission) forwarded to DUT 112 may be delivered using any one of a number of protocols. More specifically, the underlying protocols and headers of the digital frame stream ultimate used do not affect the implementation of the present subject matter in any manner. For example, in one embodiment, the encoded digital frame stream may be a real-time transport protocol (RTP) packet stream that is constructed from layer 2 headers, layer 3 headers, layer 4 headers, and an AMR payload. Specifically, an RTP packet in the digital frame stream may include a media access control (MAC) header, an Internet protocol (IP) header, a user datagram protocol (UDP) header, a GTP header, an RTP header, and an AMR payload header with the AMR payload. Similarly, the digital frame stream may include other additional packet components, which may differ based on the testing environment being used. For example, in a Voice over LTE testing environment, the digital frame stream may comprise packet headers/components that include one or more of an eNodeB MAC, outer IP, outer UDP, GTP, IP, UDP, RTP, and AMR components.

After encoding the plurality of digital payload streams (e.g., "payloads") at different bit rates for the audio stream clip, encoder unit 122 forwards the encoded payload streams to payload storage unit 116 in traffic generator unit 102. In one embodiment, payload storage unit 116 may include a database or any other like storage unit that is configured to separately store the plurality of encoded digital payload streams in accordance to the different bit rates used for encoding.

Figure 2:
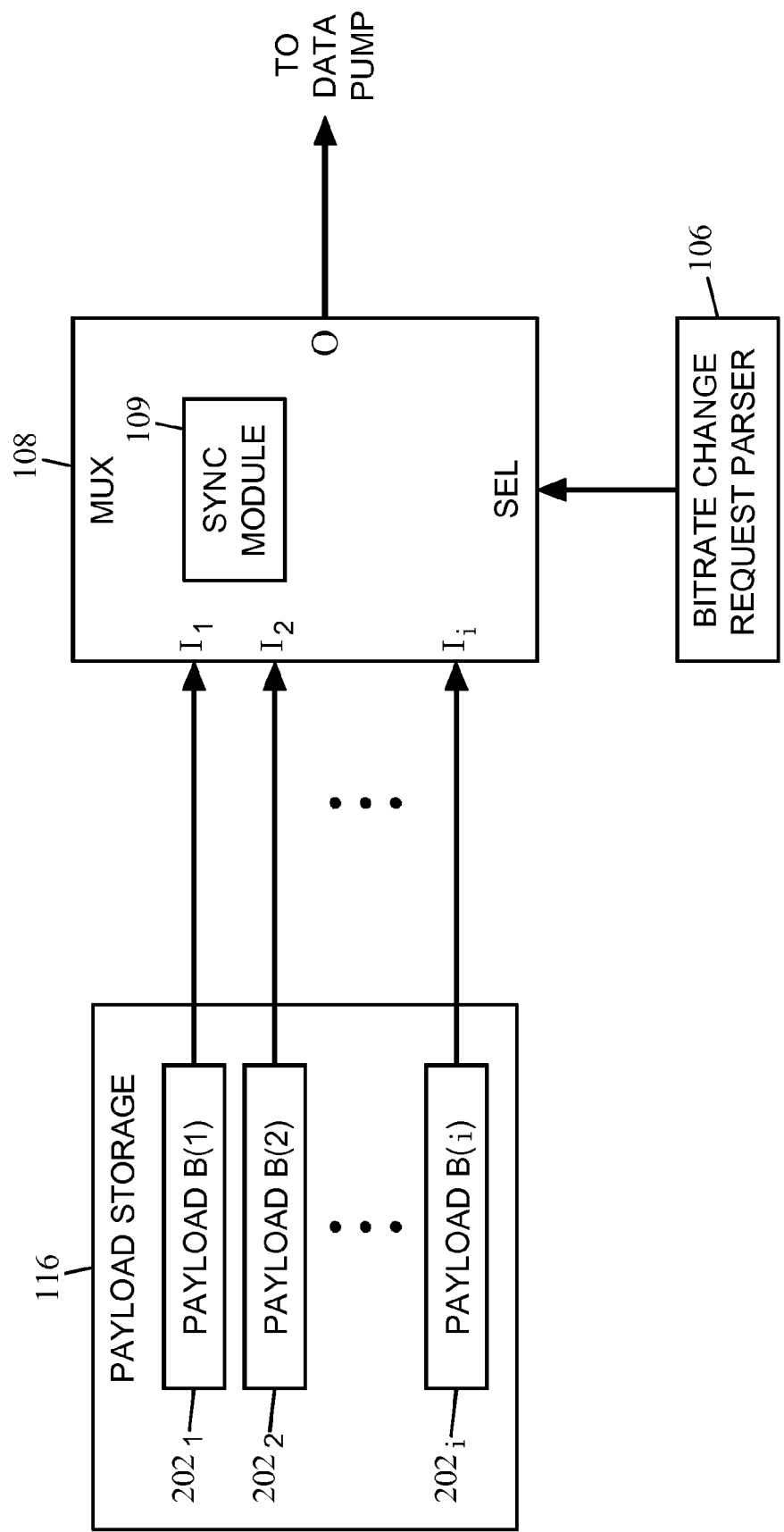
FIG. 2 is a diagram illustrating a payload database in a traffic generator unit according to an embodiment of the subject matter described herein.

FIG. 2 provides a detailed illustration of payload storage unit 116. For example, payload storage unit 116 contains a plurality of pre-encoded payloads $202_{1...i}$, where i is equal to the number of supported bit rates (e.g., i=8 for AMR-NB and i=9 for AMR-WB). For example, for a given audio stream clip that is processed by an AMR-NB codec module 124, payload storage unit 116 stores an associated digital payload stream for each of the eight different supported bit rates. Although storing the plurality of different encoded digital payload streams generated from a single received audio stream clip utilizes more memory resources and storage space, valuable CPU processing resources associated with traffic generator unit 102 are conserved.

In one embodiment, each of the plurality of payloads $202_{1...i}$ in payload storage unit 116 is linked to an input port of a multiplexer unit 108. In one embodiment, multiplexer unit 108 includes a packet generator module (not shown) that is configured to packetize the payload streams received from payload storage unit 116. For example, the packet generator may packetize the AMR payload streams from payload storage unit 116 into real-time transport protocol (RTP) packets. Multiplexer unit 108 may include any hardware and/or software based multiplexing device/module that is configured to forward a designated packet stream transmission to a data pump unit 110. Data pump unit 110 may be any device that is be configured to send a packet stream over a telecommunications network or a testing environment network. In one embodiment, data pump unit 110 may function as a queue where packets of a stream transmission (i.e., digital frame stream) are placed and subsequently sent to DUT 112 via a network interface card driver.

In one embodiment, the designated bit rate payload stream is determined by the current bit rate index provided by a bit rate change request parser unit 106. For example, bit rate change request parser unit 106 provides an index number (e.g., index numbers 1 through i, where i may equal 8 for an AMR-NB payload database or i may equal 9 for an AMR-WB payload database) that corresponds to one of the plurality of stored payload streams (and/or associated multiplexer input port) contained in payload storage unit 116. For example, FIG. 2 depicts payloads $202_{1...i}$ which are respectively linked to input ports $I_1$-$I_i$. Multiplexer unit 108 may be configured open the designated input port associated with any selected index number that is provided. In one embodiment, the selected index number is provided by a bit rate change request parser unit 106 in a manner described below. Multiplexer unit 108 may then packetize the payload stream data as payload (e.g., AMR payload) in RTP packets (e.g., using a packet generator) and subsequently transmit the resulting digital frame stream (i.e., packet stream transmission) to a data pump (e.g., data pump unit 110) via output port O of multiplexer unit 108. After receiving the digital frame stream from multiplexer unit 108, data pump unit 110 may then forward the currently designated bit rate packet stream transmission to DUT 112.

In one embodiment, DUT 112 includes a bit rate change request generator module 104 that is configured to transmit the bit rate change requests made by DUT 112. For example, bit rate change request generator module 104 may send a bit rate change request (e.g., via RTP packet stream) to bit rate change request parser unit 106 that indicates that the current bit rate being used to send the packet stream transmission to DUT 112 via data pump unit 110 is to be changed. In one embodiment, bit rate change request parser unit 106 receives a bit rate change request in the form of an in-band parameter value contained within payload headers of the RTP packet stream sent by DUT 112 to bit rate change request parser unit 106. Bit rate change request parser unit 106 may be configured to parse the received RTP stream packet to access a payload header. For example, the AMR payload has a header that includes a Codec Mode Request (CMR) field, which contains a CMR value. The stored CMR value may be used as an index by bit rate change request parser unit 106 to select/designate a new bit rate payload in payload storage unit 116. Based on the received bit rate change request, bit rate change request parser unit 106 sends an appropriate instruction message to multiplexer unit 108. In one embodiment, bit rate change request parser unit 106 includes a mapping between the bit rate change request CMR value and a traffic index number (e.g., indexes identifying payloads 202). By utilizing the mapping, bit rate change request parser unit 106 may send an index number (e.g., traffic index number) that is associated with the new (requested) bit rate payload stream and the input port on multiplexer unit 108. In one embodiment, bit rate change request parser unit 106 maintains a database that maps each of the input ports $I_1$-$I_i$ to payloads $202_1 \ldots _i$. After receiving a request for a particular bit rate, bit rate change request parser unit 106 provides an associated index number corresponding to an input port to the selection input (SEL as shown in FIG. 2) of multiplexer unit 108. In one embodiment, bit rate change request parser unit 106 generates a request message that includes an index number (i.e., the traffic index number). Bit rate change request parser unit 106 may then forward the index number to multiplexer unit 108. Multiplexer unit 108 may then use the index number to select a corresponding input port to forward the associated digital payload stream associated with the requested bit rate (in packetized form) to data pump unit 110 via output port O.

In one embodiment, payload storage unit 116 may include a mapping between the bit rate change request and the traffic index. Upon receiving an RTP packet, bit rate change request parser unit 106 may access and forward a CMR value contained in the AMR payload of the RTP packet to payload storage unit 116 to select a new bit rate payload stream 202.

FIG. 2 further depicts multiplexer unit 108 provisioned with a synchronization module 109. In one embodiment, synchronization module 109 is configured to coordinate the packet stream being delivered to data pump unit 110 if multiplexer unit 108 receives a bit rate change via the multiplexer selector input. In the event the bit rate change request is received at bit rate change request parser unit 106 while the current payload is being streamed, synchronization module 109 enables multiplexer unit 108 to synchronize the two different payload streams (i.e., the current bit rate payload stream and the requested new bit rate payload stream). For example, at the time the bit rate change request is received, multiplexer unit 108 may receive an index number of the packet (e.g., packet X of bit rate B(3)) currently being forwarded from multiplexer unit 108 to data pump unit 112 at the current bit rate. Multiplexer unit 108 may then receive the index number of a packet (e.g., packet Y of bit rate B(1)) of the newly selected bit rate payload that corresponds to the subsequent packet (e.g., packet X+1 of bit rate B(1)) that would have followed the packet currently being forwarded (i.e., packet X). This process is illustrated in FIG. 3.

Figure 3:
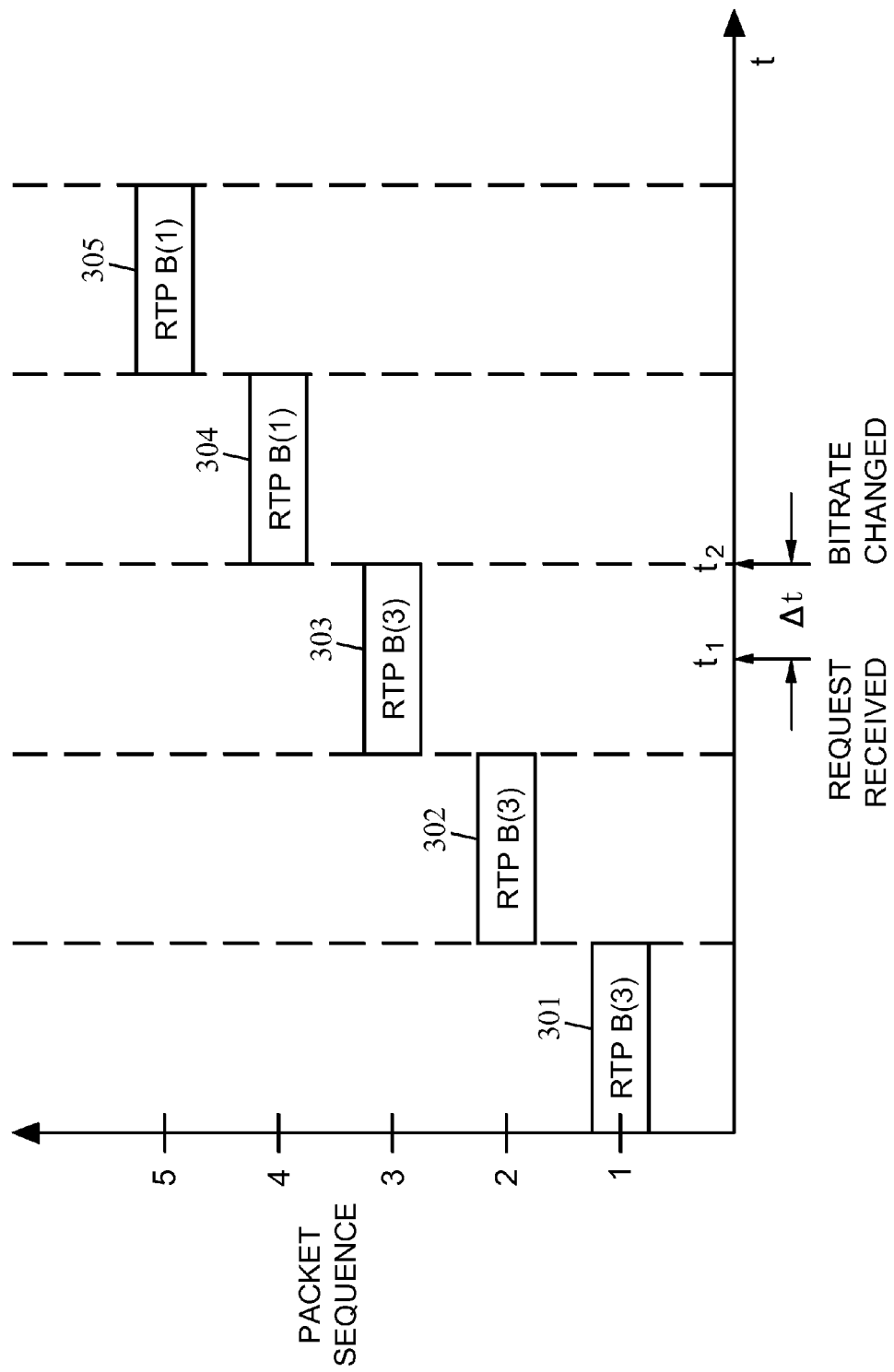
FIG. 3 is a diagram illustrating the synchronization of pre-encoded payloads in a stream transmission according to an embodiment of the subject matter described herein.

FIG. 3 depicts a diagram illustrating a payload stream synchronization process according to an embodiment of the subject matter described herein. FIG. 3 depicts a synchronization process that correlates/synchronizes a first packet of a second payload stream with a last packet of a first payload stream in order to transition the packet stream transmission (i.e., digital frame stream) from a first bit rate to a second bit rate. For example, FIG. 3 depicts a sequence of packets 301-305 that are transmitted by multiplexer unit 108 to data pump unit 110. Notably, packets 301-303 are shown to be RTP packets that are transmitted at a selected bit rate of "3" (i.e., B(3)). At time "$t_1$", a bit rate change request is received at multiplexer unit 108 via bit rate change request parser unit 106. For example, the bit rate change request may indicate that the digital frame stream (i.e., packet stream transmission) that is being streamed from multiplexer unit 108 to data pump unit 110 should be changed to a new bit rate of "1" (i.e., B(1)). At this time, synchronization module 109 in multiplexer unit 108 may be configured to select a new input port (e.g., $I_1$) in accordance to the requested a bit rate change. However, synchronization module 109 may be configured to delay the switchover to the new input port until the last packet (i.e., packet 303) of bit rate 3 is processed (e.g., received and forwarded) by multiplexer unit 108 at time "$t_2$". Notably, the synchronization process conducted by synchronization module 109 enables multiplexer unit 108 to forward packet 304 (which is encoded at a bit rate of 1) at time "$t_2$". Thus, the digital frame stream continues being sent to data pump unit 110 at the new bit rate (i.e., B(1)) without any interruption or gaps. Referring to FIG. 3, the amount of time between $t_1$ and $t_2$ is $\Delta t$. Thus, in accordance with the present subject matter, the maximum of $\Delta t$ is equal to a packet length time (e.g., max($\Delta t$)=packet time). Previous to the present subject matter, a bit rate change request was received by the traffic generator device, the encoder rate was modified to accommodate the bit rate change request, and the audio stream clip was encoded in the requested bit rate in real time. All of these factors contributed to a processing delay that is eliminated by the present subject matter.

Figure 4:
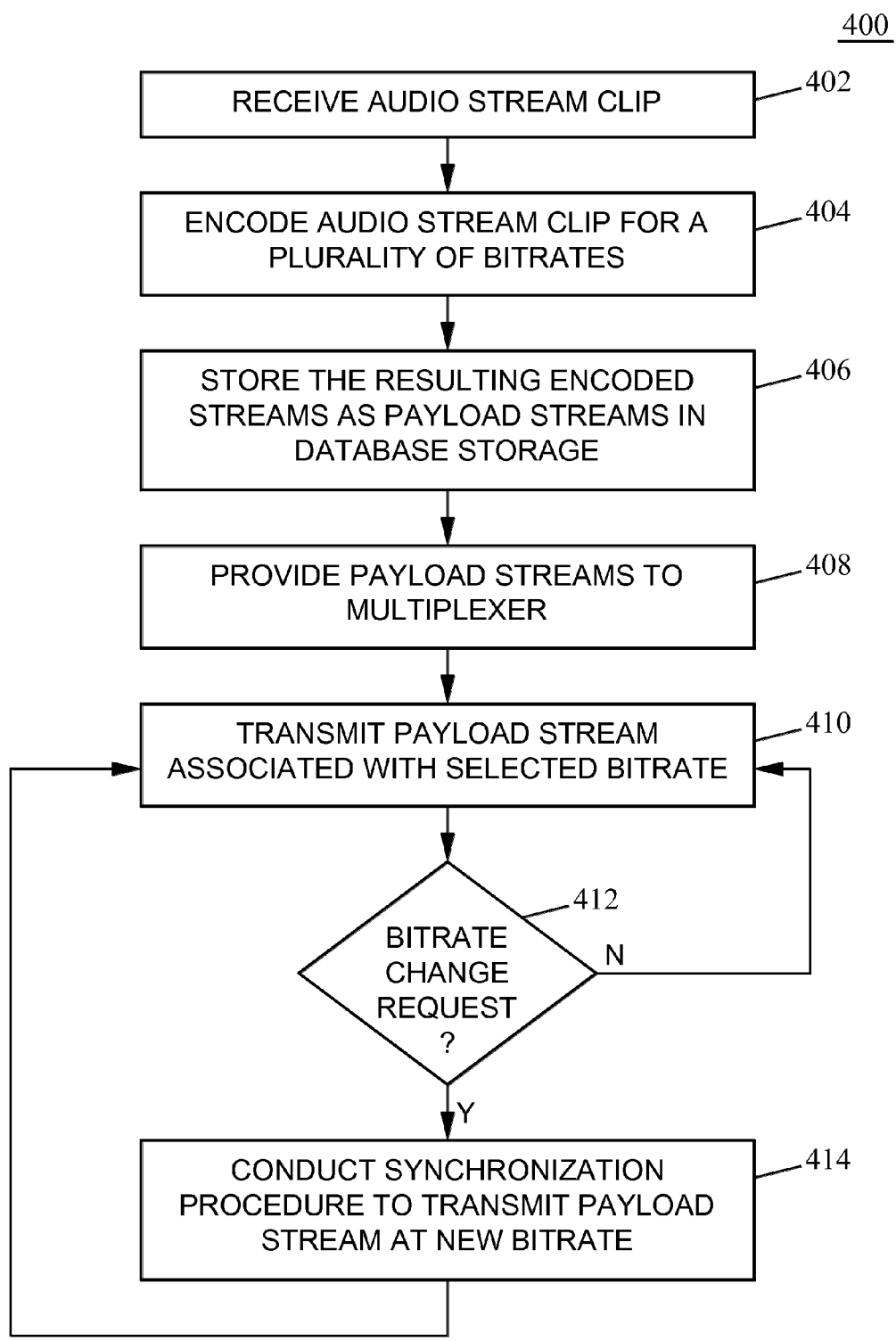
FIG. 4 is a flow chart illustrating an exemplary process for utilizing a plurality of pre-encoded payloads to generate a packet stream transmission according to an embodiment of the subject matter described herein.

FIG. 4 is a flow chart illustrating an exemplary process for utilizing pre-encoded traffic payloads according to an embodiment of the subject matter described herein. In block 402, an audio stream clip is received. In one embodiment, audio stream generator unit 120 generates one or more audio stream clips that are forwarded to encoder unit 122. In one embodiment, audio stream generator unit 120 selects an audio stream clip from an audio stream clip pool (not shown) and forwards the selected audio stream clip to encoder unit 122. The audio stream clip may include an audio file of any digital audio format (e.g., a waveform audio file format (WAV), an audio interchange file format (AIFF), a 3GP file format, etc.).

In block 404, the audio stream clip is encoded into a digital payload stream for at least some or for each of a plurality of bit rates. In one embodiment, encoder unit 122 includes codec module 124 that is configured to encode the received audio stream clip into a plurality of digital payload streams, wherein at least some digital payload stream is encoded at a different bit rate. For example, codec module 124 may comprise an AMR codec that is configured to pre-encode a single audio stream clip into eight (8) different digital payload streams for eight (8) different bit rates. Code module 124 may alternatively comprise a wideband AMR codec that is configured to pre-encode a single audio stream clip into nine (9) different digital payload streams for nine (9) different bit rates.

In block 406, the plurality of digital payload streams are separately stored in a database. In one embodiment, the different (bit rate) digital payload streams associated with the single audio stream clip are forwarded to payload storage unit 116. For example, payload storage unit 116 may be configured to store the pre-encoded digital payload streams separately in accordance to the encoding bit rate.

In block 408, a digital payload stream associated with one of the available bit rates is initiated. In one embodiment, the eight pre-encoded digital payload streams in payload storage unit 116 are provided to multiplexer unit 108 as eight separate input ports (e.g., input ports $I_0$ through $I_7$). Multiplexer unit 108 includes one or more selection lines (or "selector") which is collectively used to designate one of the eight multiplexer input ports associated with the eight pre-encoded digital payload streams. Notably, the digital payload stream (i.e., a first digital payload stream encoded at a first bit rate) on the selected input is forwarded to the output port of multiplexer unit 108.

In block 410, the payload stream associated with the selected bit rate is transmitted. In one embodiment, multiplexer unit 108 packetizes the payload stream into a digital frame stream (e.g., a packet stream transmission) that is forwarded from the output port to data pump unit 110. For example, multiplexer unit 108 may be configured to forward an RTP packet stream with an AMR payload associated with the designated bit rate to data pump unit 110. Data pump unit 110 subsequently forwards the received RTP packet stream to a network interface of traffic generator unit 102 for delivery to DUT 112.

In block 412, a determination is made as to whether a bit rate change request is received. In one embodiment, bit rate change request parser unit 106 may be configured to receive bit rate change requests directed from DUT 112 to traffic generator unit 102. The received bit rate change request may indicate that a second payload stream encoded at second bit rate is to be used as payload for the packet stream transmission. If a bit rate change request is received, then method 400 proceeds to block 414. In one embodiment, bit rate change request parser unit 106 receives bit rate change requests from bit rate change request generator module 104 in DUT 112. Alternatively, if a bit rate change request is not received, then method 400 loops back to block 410 and continues to forward the RTP packet stream (e.g., packet stream transmission) at the current designated bit rate.

In block 414, a synchronization procedure to transmit the digital frame stream at the new bit rate is conducted. In one embodiment, synchronization module 109 is configured to synchronize the first packet output of the digital frame stream at the new bit rate with the last packet output of the digital frame stream associated with the previous bit rate (where the digital frame stream is associated with the same original audio stream) in a manner described above with respect to FIG. 3. For example, the conducted synchronization procedure may involve correlating/synchronizing the first packet of the second payload stream with the last packet of the first payload stream in order to transition the packet stream transmission from the first bit rate to the second bit rate.

In one embodiment, traffic generator unit 102 is able to utilize a stream index number that indicates which packet is to be sent next as part of the stream transmission to DUT 112 via data pump unit 110. In one embodiment, synchronization module 109 may retain and maintain a stream index (e.g., a stream index number) for the stream transmission (i.e., digital frame stream) sent to DUT 112. Alternatively, a module in payload storage unit 116 may be configured to maintain the stream index for the stream transmission. In one embodiment, the stream index is relative to the beginning of the AMR payloads stored in payload storage unit 116 which allows for uninterrupted streaming despite a change in the requested bit rate. For example, in the event a bit rate change request is received by traffic generator unit 102, multiplexer unit 108 may subsequently select a new AMR payload stream from payload storage unit 116. However, the stream index remains the same regardless of the new bit rate payload stream selected/designated. Thus, synchronization module 109 may utilize the stream index to designate the "next" packet of the stream transmission (i.e., the first packet of the new bit rate payload stream) for assembly and transmission to data pump unit 110. Method 400 may then loop back to block 410 where the digital frame stream transmission is transmitted at the new selected bit rate.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for utilizing a plurality of pre-encoded payload streams, the method comprising:
   receiving a plurality of digital payload streams associated with an audio stream clip file, wherein at least some of the digital payload streams are generated by encoding the audio stream clip file at different bit rates;
   selecting a first digital payload stream encoded at a first bit rate from the plurality of digital payload streams as the payload for a packet stream transmission being sent to a device under test (DUT);
   receiving, from the DUT, a bit rate change request that indicates a second digital payload stream encoded at a second bit rate from the plurality of digital payload streams is to be used as the payload for the packet stream transmission being sent to the DUT; and
   conducting a synchronization procedure that synchronizes a first packet of the second digital payload stream with a last packet of the first digital payload stream in order to transition the packet stream transmission from the first bit rate to the second bit rate, wherein the last packet is a packet being processed for the packet stream transmission at the time the bit rate change request is received.

2. The method of claim 1 comprising storing the plurality of received digital payload streams in a payload storage unit.

3. The method of claim 1 receiving a bit rate change request includes:
   receiving a real-time transport protocol (RTP) packet from the DUT;
   parsing the RTP packet to access a payload header in the RTP packet; and
   detecting a codec mode request (CMR) value in the payload header that indicates the bit rate change request.

4. The method of claim 1 wherein the audio stream clip file is encoded into the plurality of digital adaptive multi-rate (AMR) payload streams by an AMR codec.

5. The method of claim 4 wherein the AMR codec includes a narrowband AMR (AMR-NB) codec or a wideband AMR (AMR-WB) codec.

6. The method of claim 1 wherein the audio stream clip file is encoded into the plurality of digital payload streams without compression.

7. The method of claim 1 wherein the audio stream clip file includes a waveform audio file format (WAV) file, an audio interchange file format (AIFF) file, or a 3GP file.

8. The method of claim 1 wherein the packet stream transmission includes a real-time transport protocol (RTP) packet stream transmission.

9. The method of claim 1 wherein the packet stream transmission includes bit rate change request information that is directed to the DUT.

10. The method of claim 1 wherein the DUT includes a mobile phone device, a soft phone, or a media gateway in a testing environment.

11. A system for utilizing a plurality of pre-encoded payload streams, the system comprising:

a payload storage unit configured to receive a plurality of digital payload streams associated with an audio stream clip file, wherein at least some of the digital payload streams are generated by encoding the audio stream clip file at different bit rates; and a multiplexer unit configured to select a first digital payload stream encoded at a first bit rate from the plurality of digital payload streams as the payload for a packet stream transmission being sent to a device under test (DUT), to receive, from the DUT, a bit rate change request from a bit rate change request parser that indicates a second digital payload stream encoded at a first bit rate from the plurality of digital payload streams is to be used as the payload for the packet stream transmission being sent to the DUT, and to conduct a synchronization procedure that synchronizes a first packet of the second digital payload stream with a last packet of the first digital payload stream in order to transition the packet stream transmission from the first bit rate to the second bit rate, wherein the last packet is a packet being processed for the packet stream transmission at the time the bit rate change request is received.

12. The system of claim 11 wherein the payload storage unit is further configured to store the plurality of digital payload streams.

13. The system of claim 11 wherein a bit rate change request parser unit is further configured to receive a real-time transport protocol (RTP) packet from the DUT, to parse the RTP packet to access a payload header in the RTP packet, and to detect a codec mode request (CMR) value in the payload header that indicates the bit rate change request.

14. The system of claim 11 wherein the audio stream clip file is encoded into the plurality of digital adaptive multi-rate (AMR) payload streams by an AMR codec.

15. The system of claim 14 wherein the AMR codec includes a narrowband AMR (AMR-NB) codec or a wideband AMR (AMR-WB) codec.

16. The system of claim 11 wherein the audio stream clip file is encoded into the plurality of digital payload streams without compression.

17. The system of claim 11 wherein the audio stream clip file includes a waveform audio file format (WAV) file, an audio interchange file format (AIFF) file, or a 3GP file.

18. The system of claim 11 wherein the packet stream transmission includes a real-time transport protocol (RTP) packet stream transmission.

19. The system of claim 11 wherein the DUT includes a mobile phone device, a soft phone, or a media gateway in a testing environment.

20. A non-transitory computer readable medium comprising computer executable instructions embodied in a computer readable medium that when executed by a processor of a computer control the computer to perform steps comprising:

receiving a plurality of digital payload streams associated with an audio stream clip file, wherein at least some of the digital payload streams are generated by encoding the audio stream clip file at different bit rates;

selecting a first digital payload stream encoded at a first bit rate from the plurality of digital payload streams as the payload for a packet stream transmission being sent to a device under test (DUT);

receiving, from the DUT, a bit rate change request that indicates a second digital payload stream encoded at a second bit rate from the plurality of digital payload streams is to be used as the payload for the packet stream transmission being sent to the DUT; and conducting a synchronization procedure that synchronizes a first packet of the second digital payload stream with a last packet of the first digital payload stream in order to transition the packet stream transmission from the first bit rate to the second bit rate, wherein the last packet is a packet being processed for the packet stream transmission at the time the bit rate change request is received.

* * * * *